(12) United States Patent
Le Gallou et al.

(10) Patent No.: US 11,158,082 B2
(45) Date of Patent: Oct. 26, 2021

(54) METHOD FOR DETERMINING AT LEAST ONE PARAMETER ASSOCIATED WITH AN OPHTHALMIC DEVICE

(71) Applicants: FITTINGBOX, Labege (FR); VISIONHUB, Charenton-le-Pont (FR)

(72) Inventors: Sylvain Le Gallou, Saint Orens de Gameville (FR); Jérome Guenard, Toulouse (FR); Ariel Choukroun, Saint Orens de Gameville (FR); Serge Coural, Lisses (FR)

(73) Assignees: FITTINGBOX, Labege (FR); ESSILOR INTERNATIONAL, Charenton-le-Pont (FR)

( * ) Notice: Subject to any disclaimer, the term of this patent is extended or adjusted under 35 U.S.C. 154(b) by 0 days.

(21) Appl. No.: 16/633,721

(22) PCT Filed: Jul. 20, 2018

(86) PCT No.: PCT/EP2018/069792
§ 371 (c)(1),
(2) Date: Jan. 24, 2020

(87) PCT Pub. No.: WO2019/020521
PCT Pub. Date: Jan. 31, 2019

(65) Prior Publication Data
US 2020/0211218 A1 Jul. 2, 2020

(30) Foreign Application Priority Data
Jul. 25, 2017 (FR) ...................................... 1757070

(51) Int. Cl.
*G06K 9/00* (2006.01)
*G06T 7/73* (2017.01)
*G02C 13/00* (2006.01)

(52) U.S. Cl.
CPC .............. *G06T 7/73* (2017.01); *G02C 13/005* (2013.01); *G06T 7/74* (2017.01);
(Continued)

(58) Field of Classification Search
CPC ......................................................... G06T 7/97
See application file for complete search history.

(56) References Cited

U.S. PATENT DOCUMENTS

2009/0021693 A1  1/2009  Sessner et al.
2014/0253875 A1  9/2014  Le Gallou et al.
(Continued)

FOREIGN PATENT DOCUMENTS

EP         2 772 795 A1    9/2014

OTHER PUBLICATIONS

International Search Report, dated Sep. 19, 2018, corresponding to International Application No. PCT/EP2018/069792.

*Primary Examiner* — Oneal R Mistry
(74) *Attorney, Agent, or Firm* — Ladas & Parry LLP; Malcolm J. MacDonald (57) ABSTRACT

A method for automatically determining at least one parameter associated with an ophthalmic device selected by an individual, said device comprising a frame referred to as selected frame, said determination being carried out from an acquired image of the face of the individual wearing the selected frame or a frame of a second ophthalmic device. The method includes the steps of: detecting at least one characteristic point of at least one eye of the individual the acquired image and estimating the three-dimensional position of the one or more characteristic point(s) detected; detecting the frame worn and estimating the three-dimensional position of the frame worn by aligning a three-dimensional representation of the frame worn with the frame worn in the acquired image; and determining the one or
(Continued)

more parameters from the relative position of the eyes with respect to the three-dimensional representation of the selected frame.

37 Claims, 5 Drawing Sheets

(52) U.S. Cl.
CPC ............... *G06T 2207/10012* (2013.01); *G06T 2207/10028* (2013.01); *G06T 2207/30041* (2013.01); *G06T 2207/30201* (2013.01)

(56) References Cited

U.S. PATENT DOCUMENTS

| | | | |
|---|---|---|---|
| 2015/0055085 A1* | 2/2015 | Fonte | H04L 65/403 |
| | | | 351/178 |
| 2018/0096537 A1* | 4/2018 | Kornilov | G06K 9/00228 |
| 2018/0330545 A1* | 11/2018 | Jung | G06F 3/01 |
| 2019/0011731 A1* | 1/2019 | Teodorovic | G02C 13/003 |
| 2019/0147241 A1* | 5/2019 | Shudo | G06T 1/00 |
| | | | 348/78 |

* cited by examiner

METHOD FOR DETERMINING AT LEAST ONE PARAMETER ASSOCIATED WITH AN OPHTHALMIC DEVICE

TECHNICAL FIELD OF THE INVENTION

The field of the invention is that of optics, and more particularly that of measurement in order to adapt at least one lens of an ophthalmic device to an individual's eyesight.

More specifically, the invention relates to a method for determining at least one parameter associated with an ophthalmic device intended to be worn by an individual. Such device may be for example a pair of spectacles or a mask.

The invention finds applications particularly in the field of the sale of an ophthalmic device in a store or in a standalone kiosk set up for example in a retail area not specialized in optics.

STATE OF THE RELATED ART

Generally, adapting lenses to an individual's eyesight in a spectacle frame requires to determine optical parameters such as lens width, lens height, bridge width, effective diameter, angle of curvature, pupillary distance, monocular pupillary distances, pupillary heights, segment heights, pantoscopic tilt, or vertex distance. There are two main standards for indicating the dimensions of a frame circle contour: the BOXING system based on framing the circle with a rectangle or the DATUM system based on the mid-height width of the circle. The BOXING system is the standard generally used by lens manufacturers and is by default on automatic grinders whereas the DATUM system is the traditional standard. In the DATUM system, the height is generally measured using a rule directly on the lens.

Figure 5:
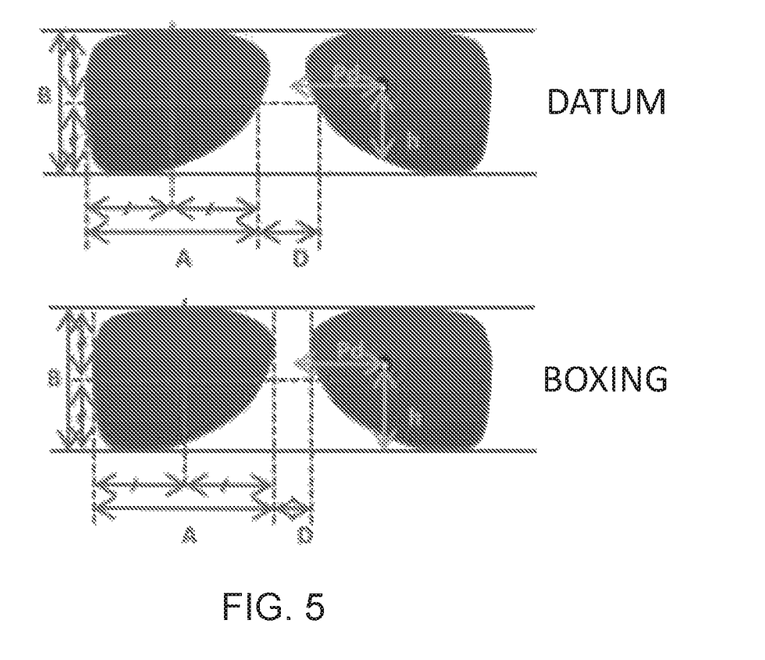
FIG. 5 illustrates the difference between the BOXING and DATUM system.

FIG. 5 illustrates the difference between the BOXING and DATUM system, wherein A represents the lens width, D the bridge width, B the lens height. The main difference between the two systems relates to the definition of the bridge width D which in the DATUM system corresponds to the distance between the lenses measured at mid-height of the lenses whereas in the BOXING system, the bridge width D corresponds to the minimum distance between lenses. The lens centering point is defined by the interpupillary distance Pd and by the pupillary height h. The interpupillary distance (Pd) is represented in FIG. 5 from the median axis between the lenses. The height h is for its part dependent on the chosen system. In the BOXING system, the height h is defined from the lens base, i.e. from a line simultaneously tangent to both lenses. Whereas in the DATUM system, the height h is defined from the bottom edge of the lens perpendicular to the centering point.

Figure 6:
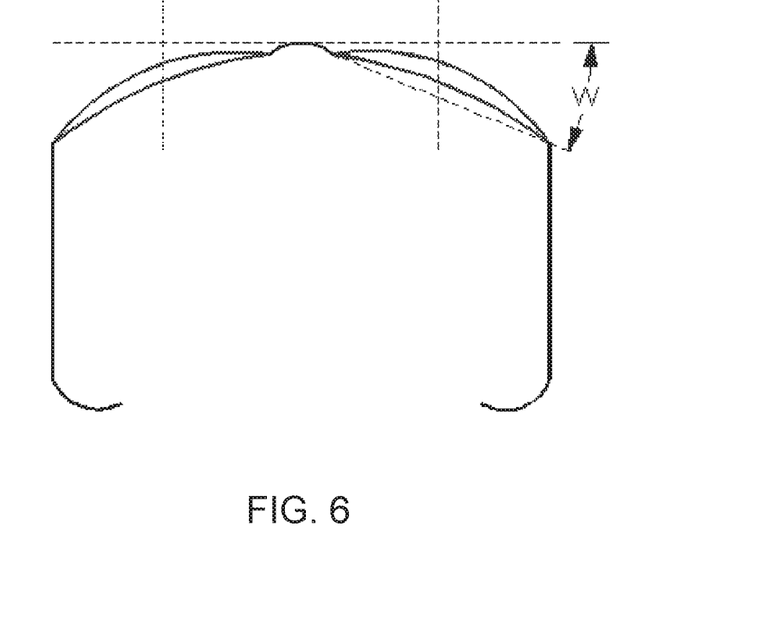
FIG. 6 is a top view representation of a frame.

FIG. 6 represents a top view of a frame illustrating the angle W referred to as the angle of curvature or wrap angle, defined by the angle between the tangent to the bridge and one of the planes joining the ends of the front of one of the lenses. This angle is measured horizontally.

The intrinsic optical parameters of the frame chosen, i.e. measurable without requiring the presence of a wearer of the frame, such as the parameters A, B, D and W, are generally measured on 2D images of the frame. These parameters are then frequently determined relatively inaccurately as the images used for the measurement correspond to projections in a plane of three-dimensional objects, that are particularly frequently curved or rounded.

The other ocular measurements of interest for lens fitting and requiring measurements on the patient are: the pupillary distance (PD), the monocular pupillary distances (monoPD), the pantoscopic tilt (PA), the vertex distance (VD), the heights given between the frame base and the pupil center (FH: acronym of the term "Fitting Heights") and the heights between the frame base and the bottom eyelid partially covering the pupil (SH: acronym of the term "Segment Heights") and finally the effective diameter (ED) which corresponds to the minimum lens diameter wherein the lens of the spectacles is to be cut.

These optical parameters relative to wearing the frame on the individual's face are generally computed by indirect methods using a mire positioned on the individual's face, generally clipped onto the frame selected by the individual. The mire used has reference frames wherein the geometric configuration is accurately known in order to measure the ocular and optical parameters associated with the individual on an image of their face wearing the frame with the mire.

The major drawback of these techniques is that the frame requires both perfect positioning of the mire on the frame and that the individual be as frontoparallel as possible relative to the measuring device. When this dual requirement is fulfilled, parallax errors are notably avoided on the measurements, which is rarely the case in practice.

Consequently, these techniques result generally in measurement errors, linked to a poor positioning of the mire, which affect the positioning of the corrected lenses in the frame chosen by the individual, it being understood that the measurement transfer between two separate frames may also introduce an additional error in the positioning of the corrections on the lenses fitted in the chosen frame.

Moreover, it should be noted that these techniques generally propose a mire frame having a substantially planar and non-curved surface, which introduces further difficulty in the measurement transfer on curved frames.

Finally, these mire-based techniques may be considered as invasive or discomforting by the individual.

It should also be noted that the mire is generally specific to a particular measurement device.

Aims of the Invention

None of the current systems is suitable for simultaneously meeting all the necessary requirements, namely proposing an automatic measurement system that is accurate and not sensitive to the positioning of the face relative to the acquisition device.

A further aim of the invention is to propose a measurement technique which does not require the intervention of a person skilled in the art in the field of optical measurement, particularly of an optician.

A further aim of the invention is to propose a measurement technique using any type of spectacle frame, and particularly directly on the frame selected by a individual requiring optical correction.

A further aim of the invention is that of minimizing measurement errors, by preventing bias associated with poor positioning and/or measurement offset.

A further aim of the invention is to propose a technique suitable for optimally adjusting the positioning of the correction made for near and/or distance vision on the lens fitted in the frame chosen by the individual.

Description of the Invention

These aims, as well as others which will emerge hereinafter, are achieved using a method for automatically determining at least one parameter associated with an ophthalmic device selected by an individual, said ophthalmic device comprising a frame referred to as selected frame, said determination being carried out from an image of face of the individual wearing a spectacle frame referred to as worn frame, said worn frame being the selected frame or a frame of a second ophthalmic device, said image being acquired by an image acquisition system.

A parameter determined by the method, which may be referred to as optical parameter, is a parameter associated with the individual's face such as the interpupillary distance, a parameter associated with a spectacle frame, such as the lens width, the bridge width or the temple width, or a parameter relating both to the frame and to the individual's face, such as the vertex distance or the pantoscopic tilt. Based on the parameter(s) determined by the method, it is thus possible to size an optionally corrective lens so as to position same correctly in the frame according to the individual required to wear the frame.

An ophthalmic device may be for example a pair of spectacles or a mask. The ophthalmic device may also be a device for protecting the eyes of the individual wearing said device on his face.

It should be noted that the frame of an ophthalmic device generally extends laterally on either side of the individual's head.

The frame worn by the individual and used by the method according to the invention may advantageously be the final frame selected by the individual, which makes it possible to determine the parameters specifically according to the wearing on the individual's face of the selected frame. Generally, the selected frame is an actual frame chosen by the individual seeking to purchase the frame wherein at least one corrective lens is to be fitted.

It should be noted that in an advantageous embodiment, the frame worn by the individual is a conventional frame not comprising any specific reference frame intended to measure parameters by identifying the three-dimensional position of the reference frames.

Moreover, the worn frame may advantageously comprise at least one lens without optical corrections, commonly referred to as neutral lens, or at least one corrective lens. It should be noted that said corrective lens comprises at least one optical correction.

According to the invention, the determination method comprises steps of:
  detecting at least one characteristic point of at least one eye of the individual on the acquired image and estimating in the reference frame of the image acquisition system, the three-dimensional position of the characteristic point(s) detected;
  detecting the worn frame and estimating the three-dimensional position of the worn frame in the reference frame of the image acquisition system by aligning a three-dimensional representation of the worn frame with the worn frame in the acquired image;
  in the case where the worn frame is the frame of the second ophthalmic device, positioning, in the reference frame of the image acquisition system, a three-dimensional representation of the selected frame, the representation of the selected frame being positioned with respect to the representation of the worn frame by means of a positioning offset between the two frames, said offset being predefined;
  expressing the position of each characteristic point with respect to the three-dimensional representation of the selected frame;
  determining the parameter(s) from the relative position of the eyes with respect to the three-dimensional representation of the selected frame.

In other words, in the first case, wherein the individual wears the selected frame in the acquired image, the determination method comprises steps of:
  detecting at least one characteristic point of at least one eye of the individual on the acquired image and estimating in the reference frame of the image acquisition system, the three-dimensional position of the characteristic point(s) detected;
  detecting the selected frame and estimating the three-dimensional position of the selected frame in the reference frame of the image acquisition system by aligning a three-dimensional representation of the selected frame with the selected frame in the acquired image;
  expressing the position of each characteristic point with respect to the three-dimensional representation of the selected frame;
  determining the parameter(s) from the relative position of the eyes with respect to the three-dimensional representation of the selected frame.

In the second case, wherein the individual wears the frame of the second ophthalmic device, also referred to as second frame, in the acquired image, the determination method comprises steps of:
  detecting at least one characteristic point of at least one eye of the individual on the acquired image and estimating in the reference frame of the image acquisition system, the three-dimensional position of the characteristic point(s) detected;
  detecting the second frame and estimating the three-dimensional position of the second frame in the reference frame of the image acquisition system by aligning a three-dimensional representation of the second frame with the second frame in the acquired image;
  positioning, in the reference frame of the image acquisition system, a three-dimensional representation of the selected frame, the representation of the selected frame being positioned with respect to the representation of the second frame by means of a positioning offset between the two frames, said offset being predefined;
  expressing the position of each characteristic point with respect to the three-dimensional representation of the selected frame;
  determining the parameter(s) from the relative position of the eyes with respect to the three-dimensional representation of the selected frame.

Thus, in both cases, the measurement of one or a plurality of parameters is accurate as it is performed directly on the frame selected by the individual thanks to a faithful representation of the selected frame which is virtually superimposed on the worn frame. These measured parameters are particularly useful for adapting the lenses to the frame.

In the second case, the second frame serves as a positioning reference for the selected frame. An offset may be introduced as the two frame which are generally not identical, are positioned differently when worn on the face. In particular, the contact points on the nose and ears may be different according to the shape and/or size of each frame.

The characteristic point of the eye is preferentially a characteristic point of the pupil, a characteristic point of the iris or a characteristic point of the eyeball such as for example the center of rotation thereof.

It should be noted that the expression of the position of each characteristic point is generally carried out in a common reference frame with that of the three-dimensional representation of the selected frame. Preferentially, to determine the parameters, the reference frame using the computation corresponds to the reference frame of the three-dimensional representation of the selected frame.

The representation of a frame has generally been carried out using modelling techniques well-known to those skilled in the art, such as for example that described in the international patent application published under the number WO 2013/139814.

It should be noted that measurement quality is dependent on the quality of the three-dimensional representation of the frame in a virtual space. Without the alignment of the representation of the frame actually worn with the frame worn in the acquired image, it is very difficult to obtain directly the three-dimensional actually worn frame position with respect to the image acquisition position, which does not make it possible to obtain reliable and accurate measurement quality.

It should also be noted that the determination of the three-dimensional positioning of the worn frame is performed particularly by means of the virtual frame which is aligned on the worn frame in the acquired image and not by a direct computation of the position of the worn frame by a three-dimensional scanner or with a depth camera.

Moreover, the determination of the positioning may also be performed on an image, on a depth map or on a point cloud obtained from a scanner. Indeed, for each of these cases, an alignment of a three-dimensional representation of the frame is performed either in two dimensions by means of a projection of the three-dimensional representation of the frame on the acquired image or directly in three dimensions by means of the depth map or point cloud of the scanner. This alignment of the three-dimensional representation of the frame particularly makes it possible to retain the semantics of the pair of spectacles and avoid interpreting the acquired images.

By way of example, it is possible to obtain at the present time a three-dimensional representation of the frame in a virtual space with less than 0.2 mm deviation with respect to the actual frame, hence making it possible to obtain a parameter measurement quality of less than 0.5 mm, advantageously less than 0.1 mm.

Moreover, the detection of the characteristic point(s) may be performed automatically or manually by a person skilled in the art such as an optician.

In particular embodiments of the invention, the estimation of the three-dimensional position of the worn frame is performed by computing the minimum of a distance function between the contour of the projection of the three-dimensional representation of the worn frame and the contour of the worn frame in the acquired image, the three-dimensional representation of the worn frame suitable for being articulated and/or deformed, so as to correctly position the three-dimensional representation of the worn frame, then computing the three-dimensional position of the three-dimensional representation of the worn frame, considered to correspond to the actual three-dimensional position of the worn frame.

Thus, the representation of the worn frame suitable for being articulated and/or deformed, the representation corresponds more accurately with the frame actually worn as the minimization function suitable for adjusting the representation of the worn frame makes it possible to obtain superior results. Furthermore, given that the representation is more accurate, the determination of the parameter(s) is enhanced. In other words, the errors of measurement performed by the method are reduced.

In particular embodiments of the invention, the characteristic point of each pupil is the center of the pupil which is computed as the center of a circle representing the iris, said circle being positioned and oriented in three dimensions by minimizing the distance function between the projection of the circle on the image and the contour of the pupil on the image.

In particular embodiments of the invention, the position of the center of the eyeball of an eye is computed:
in the case where the point of gaze of said eye is known, as equal to the point situated on the line defined by the center of the pupil of said eye and said point of gaze, at a distance equal to the mean radius of an eyeball;
in the case where the point of gaze of said eye is unknown, as equal to the center of sphere of radius equal to the mean radius of the eyeball and for which the iris represents a cutting plane.

In particular embodiments of the invention, the method also comprises steps of:
determining the 3D position of the point of gaze of each eye;
correcting the position of the center of rotation of the eyeball based on the 3D position of the predetermined point of gaze.

In particular embodiments of the invention, the 3D position of the point of gaze of each eye corresponds to an element wherein the position is known with respect to the image acquisition system.

Preferentially, such an element is an image reflected in a mirror positioned in the vicinity of the image acquisition system.

It should be noted that the mirror is generally advantageously oriented such that the individual sees the image of his face.

Thus, when the individual looks at himself in the mirror, the 3D position of the point of gaze corresponds to the image of a point of his face reflected in the mirror, such as a point in the vicinity of the eyes or corresponding to one of the eyes of the individual. The 3D position of the point of gaze may also correspond to a median point between the individual's eyes shown in the mirror.

It should be noted that the use of the mirror makes it possible to measure a mean PD by approaching the conditions of an infinite PD. Indeed, the mirror enables the individual's eyes to focus on a more distant point than the actual position of the mirror. Thus, when the individual looks at the image of his face through the mirror, the distance between these eyes and the point of gaze is substantially double that between these eyes and the mirror.

In particular embodiments of the invention, the position of the point of gaze corresponds to that of a camera of the image acquisition system.

In particular embodiments of the invention, the method also comprises a step of determining the positioning offset between the three-dimensional representation of the selected frame and the three-dimensional representation of the second frame worn by the individual, by positioning the two three-dimensional representations on a three-dimensional model representing a face.

In particular embodiments of the invention, the method also comprises a step of preparing a three-dimensional model of the face, the three-dimensional model comprising the characteristic point(s) detected, and a step of superimposing the virtual frame on the three-dimensional model of the face.

In particular embodiments of the invention, the method also comprises a step of prior acquisition of at least one image of the individual's face without spectacles, the preparation of the three-dimensional model of the face comprising a substep of aligning the model of the face prepared without spectacles with the individual's face.

It should be noted that the representations of the face may be three-dimensional representations or images captured according to the similar, or quasi-identical, viewing angle.

In other words, the preparation of the three-dimensional model of the face comprises substeps of:
 determining the actual parameters in respect of positioning and orientation of the individual's face with respect to the image acquisition system;
 representing in a virtual space the individual's face by a pre-generated virtual model, the virtual model, referred to as avatar, being positioned and oriented in the reference frame of the image acquisition system by means of the predetermined actual parameters.

In particular embodiments of the invention, the image acquisition system is stereoscopic.

In other words, in these embodiments, the image acquisition system comprises at least two cameras offset with respect to one another and oriented similarly in order to be able to infer from two images acquired simultaneously a distance with respect to the image acquisition system, of an object of the scene acquired by said system.

Preferentially, the acquisition system comprises at least three cameras.

In particular embodiments of the invention, the image acquisition system comprises a depth camera.

In particular embodiments of the invention, the image acquisition system comprises at least one infrared camera.

Thus, the image acquisition system can acquire more readily an image of the eyes situated behind a sunglass lens, which generally remove visible light at least partially, In particular embodiments of the invention, all or some of the cameras of the image acquisition system are calibrated metrically.

In other words, the intrinsic parameters of focal distance, optical center and deformation of the lens of each camera are known, as well as the extrinsic parameters in respect of relative positioning and orientation of the cameras in the reference frame, advantageously metric, of the image acquisition system, which makes it possible to make measurements directly on the image and infer the actual value in the knowledge of the scale corresponding to the camera.

Thus, the parameter(s) may be determined directly from the images without knowing precisely a dimension of the pair of spectacles worn.

In particular embodiments of the invention, the parameter determined is included in the following list:
 pupillary distance (PD);
 monocular pupillary distance (monoPD);
 pantoscopic tilt (PA);
 vertex distance (VD);
 height between the frame base and the center of a pupil (FH);
 height between the frame base and the bottom eyelid (SH);
 effective lens diameter (ED);
 the gaze path on each of the lenses.

The gaze path, also referred to as progression path, corresponds to the trajectory on the lens of the progression of the intersection of the direction of the individual's gaze with the lens, between a gaze direction corresponding to a distance vision and a gaze direction corresponding to a near vision.

Knowing the gaze path on each of the lenses accurately makes it possible in particular to adapt the position of the progressive corrections according to the position of the eyes for near vision and the position of the eyes for distance vision.

In particular embodiments of the invention, the determination of the pantoscopic tilt is performed by:
 detecting the two corners of the individual's mouth;
 estimating the 3D position of the midpoint between the two corners of the mouth;
 determining the value of the pantoscopic tilt by computing the angle between the plane formed by the midpoint and the characteristic point of each pupil, and the plane of the lenses fitted in the selected frame.

In particular embodiments of the invention, at least one parameter is determined also according to a bottom point of the frame, the bottom point being included on a line tangent simultaneously to the two lenses.

In particular embodiments of the invention, the automatic determination method comprises beforehand a step of modelling the frame worn by the individual.

In particular embodiments of the invention, the automatic determination method comprises beforehand a step of calibrating the acquisition system.

In particular embodiments of the invention, the automatic determination method also comprises a step of sending a lens command accounting for the predetermined parameter(s).

In particular embodiments of the invention, the automatic determination method also comprises a step of adapting a lens of a pair of spectacles based on the predetermined parameter(s).

Preferentially, the method also comprises a step of machining a lens of a pair of spectacles based on the predetermined parameter(s).

The invention also relates a computer program product comprising a series of instructions for implementing the steps of the automatic determination method according to any one of the preceding embodiments.

Finally, the invention also relates to a device comprising a screen, a plurality of cameras, a computer processor and a computer memory storing said computer program product.

It should be noted that the cameras of the device are generally oriented towards the individual positioned naturally in front of the screen displaying the individual's image in real or quasi-real time.

BRIEF DESCRIPTION OF THE FIGURES

Further advantages, aims and particular features of the present invention will emerge from the following non-limiting description of at least one particular embodiment of the devices and methods according to the present invention, with reference to the appended drawings, wherein.

DETAILED DESCRIPTION OF EMBODIMENTS OF THE INVENTION

The present description is given in a non-limiting manner, each feature of an embodiment optionally being combined advantageously with any other feature of any other embodiment.

It is noted, as of now, that the figures are not to scale.

Example of an Embodiment of the Invention

Figure 1:
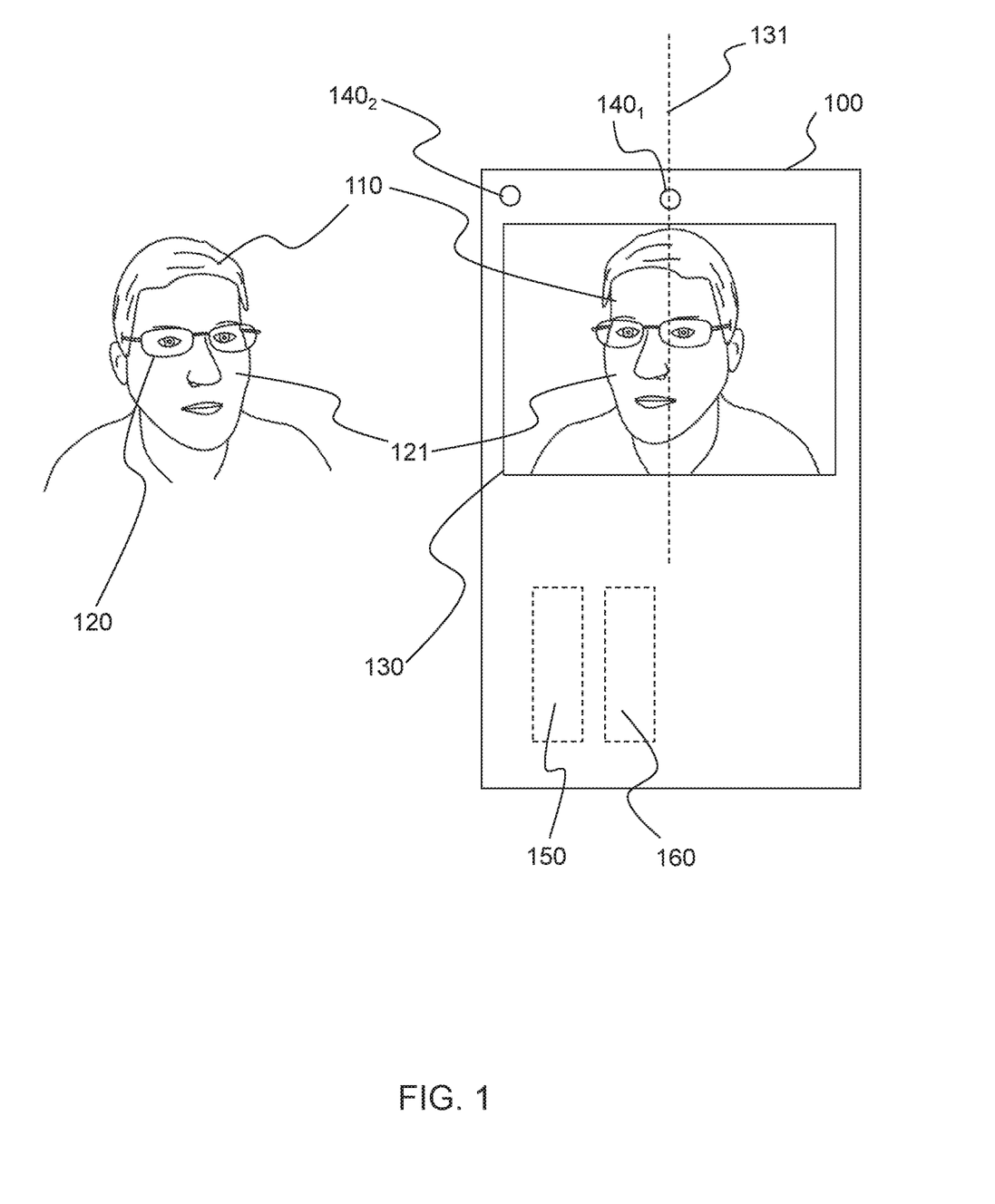
FIG. 1 represents an example of a device for measuring an optical parameter according to the invention.

FIG. 1 represents a device 100 for measuring optical parameters used by an individual 110 wearing a frame 120 of a pair of spectacles 120 that they have previously selected in an optical device purchase context.

In the present example, the device 100 comprises a display screen 130 placed substantially in the vertical plane and an acquisition system including at least two cameras 140. One of the two cameras 140, referred to as main camera $140_1$, is centered on the vertical median axis 131 of the display screen, whereas the other camera $140_2$ is in the same vertical plane as the main camera $140_1$ but offset horizontally to the left of the screen 130.

The main camera $140_1$ films the image of the individual 110 positioned facing the screen 130. The individual 110 thus sees his image displayed on the screen 130.

The second camera $140_2$ advantageously horizontally offset makes it possible to obtain after processing with the images obtained by the main camera a three-dimensional representation of the scene, also referred to as stereoscopic image. Such a stereoscopic image is for example obtained when the horizontal offset is of the order of a centimeter or of some ten centimeters.

This three-dimensional representation may be enhanced by adding further cameras, such as for example a third camera positioned symmetrically with respect to the median axis 131.

The cameras 140 may be advantageously sensitive to infrared in order to both view the pupils through non-polarized sunglass lenses and limit the number of glares on any type of lens, thus facilitating the location of the pupils.

Furthermore, the cameras 140 may also comprise a polarizing filter positioned in front of the lens thereof in order to view the pupils through polarized, particularly sunglass, lenses.

It should be noted that the acquisition system is advantageously calibrated, i.e. the images of the scene provided by the cameras 140 make it possible to obtain a metric representation of the scene.

The device 100 also comprises a computer processor 150 processing the instructions of a computer program product implementing the method for automatically determining at least one optical parameter associated with the frame 120 worn by the individual 110. These instructions are particularly stored in a memory 160 included in the device 100.

Figure 2:
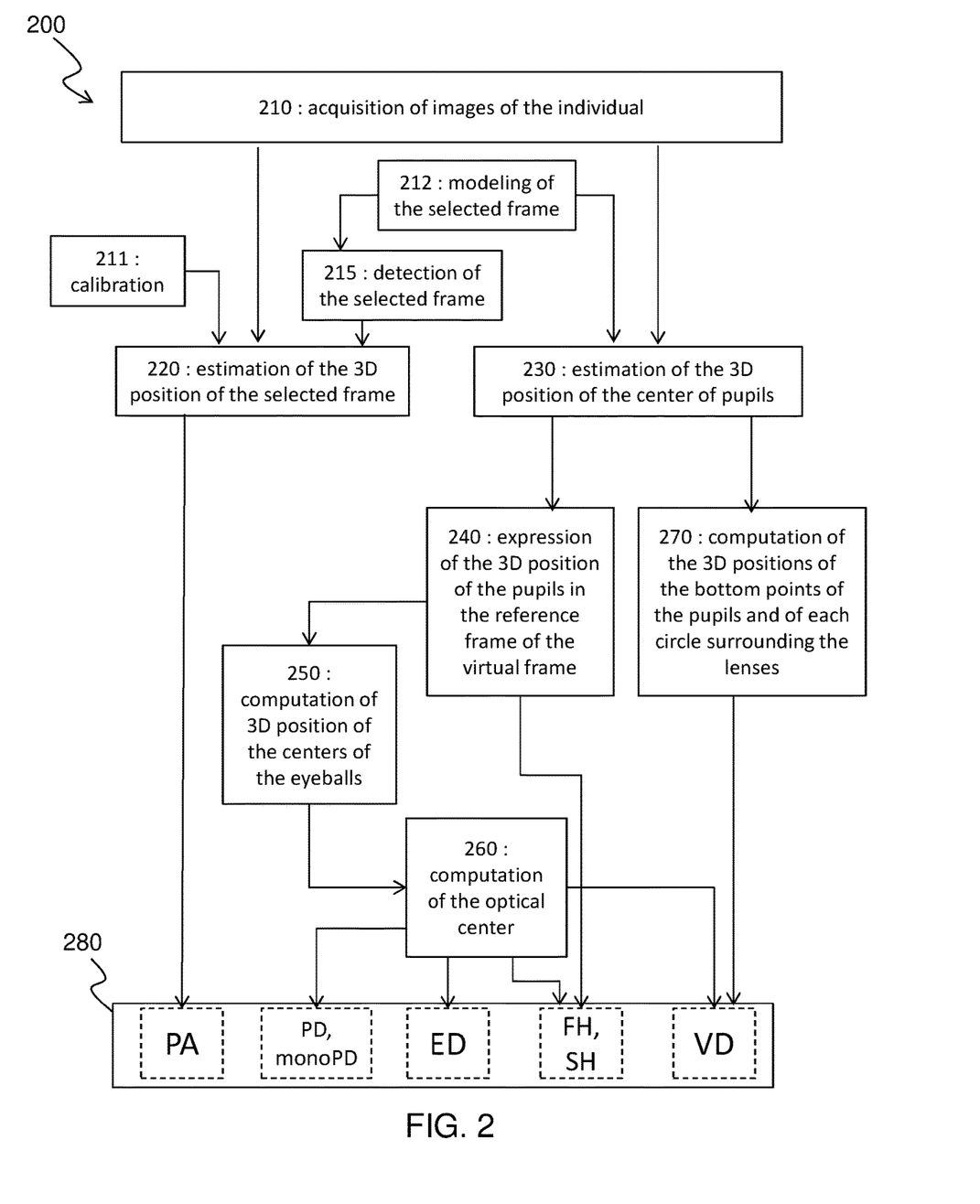
FIG. 2 is a synoptic diagram of an example of embodiment of the automatic determination method according to the invention.

FIG. 2 illustrates in the form of a synoptic diagram the automatic determination method 200, the steps whereof are processed by the computer processor 150 of the device 100.

The method comprises a first step 210 of acquisition of a plurality of images of the individual 110 wearing the frame 120. At least one image per camera 140 is acquired during this step 210.

It should be noted that the images acquired by each camera 140 are calibrated metrically. A calibration was thus carried out upstream from the acquisition of the images during a step 211.

Moreover, the selected frame 120 was also previously modelled during a step 212 by modelling techniques well-known to those skilled in the art, such as for example that described in the international patent application published under the number WO 2013/139814. A three-dimensional representation of the selected frame, also referred to as virtual frame, is thus stored in a database connected to the device 100. It should be noted that the dimensions of the three-dimensional representation are faithful to the actual frame. They are thus accurate with a deviation of less than 1 mm, advantageously less than 0.5 mm, preferentially less than 0.2 mm. Moreover, the virtual representation of the selected frame is retrieved from the database either automatically by detecting and recognizing the frame 120 worn by the individual 110, or manually by indicating the reference of the frame 120 for example by reading a barcode or by inputting on a physical keypad or on a keypad displayed on the screen 130.

Using the acquired images, the selected frame 120 is detected during a detection step 215 using for example known techniques for detecting objects based on visual descriptors. These detection methods based on a learning technique give at least a position and a scale of the object. The learning may be performed on images of frames of pairs of spectacles or on images of a face wearing a frame of a pair of spectacles. It is also possible to obtain a sufficiently accurate position and scale to perform the following step of aligning the 3D object in the 2D image, using only a face detector. Moreover, there exist also detectors, such as that described in "Deep MANTA: A Coarse-to-fine Many-Task Network for joint 2D and 3D vehicle analysis from monocular image, F. Chabot, M. Chaouch, CVPR 2017", which may provide initial 3D spatial positioning solutions of the elements sought.

In an alternative embodiment of this particular embodiment of the invention, the detection of the frame 120 worn by the individual 110 is carried out by comparing the acquired image with an image of the individual 120 not wearing a spectacle frame on his face.

Based on the acquired images wherein the selected frame 120 is detected during the step 215, an estimation of the three-dimensional position of the frame 120 with respect to the main camera $140_1$ is carried out during the step 220 of the method 200 using the virtual frame which represents faithfully the actual frame in three dimensions. The three-dimensional position of the selected frame 120, i.e. rotation $R_M$ and translation $T_M$ of the object in the 3D scene, may be obtained manually by realigning the three-dimensional representation of the selected frame on the selected frame actually worn in the acquired image of the individual 110 or automatically thanks to an algorithm for aligning 3D objects on images by initializing the algorithm at the level of the eyes of the individual 110. For such an algorithm, those skilled in the art may for example refer to the document by Yumi Iwashita, Ryo Kurazume and Kenji Hara entitled "Fast Alignment of 3D Geometrical Models and 2D Color Images using 2D Distance Maps". Those skilled in the art may also refer to the document by T. W. Drummond and R. Cipolla entitled "Real-time tracking of complex structures with on-line camera calibration" published in 2002 in the collection Image and Vision Computing.

It should be noted that the three-dimensional representation of the frame may be caused to be articulated and/or deformed during this step in order to account for the actual opening of the temples of the frame as worn by the individual 110.

To this end, a minimization equation based on the contour of the model of the frame is used. Let $gl3D_{1=1...p}$ be the 3D points of this model, $ngl3D_{1=1...p}$ the normal thereof and $\sigma^i$ the subset of these points such that the normal thereof is perpendicular with the projection thereof to the camera i, the function to be minimized is as follows:

$$\min_{Rg,Tg,\theta,\gamma} \sum_{i=1}^{n} \sum_{l \in \sigma^i} \|Proj^i(Rg(G(gl3D_1, \theta, \gamma)) + Tg) - bestCont(gl3D_1, ngl3D_1, l, Rg, Tg, \theta, \gamma)\|$$

where Rg and Tg are the rotation and translation matrices to correctly position the pair and where $G(gl3D_1,\theta,\gamma)$ is a deformation function of parameters $\theta$ and $\gamma$ controlling the opening of the temples ($\theta$) and the torsion ($\gamma$) thereof according to the position of the point to be deformed. The function bestCont( ) returns a point of the image corresponding to the point having the highest gradient norm along a segment centered on the projection of the 3D point of the model of the frame in the image. The direction along the segment is given by the projection of the normal of the 3D point. A multiple hypothesis mode such as that described in "combining Edge and Texture Information for Real-Time Accurate 3D Camera Tracking, Vacchetti, V. Lepetit, P. Fua, Third IEEE and ACM International Symposium on Mixed and Augmented Reality, 2004" makes it possible to retain the points with the highest gradient values and select the best.

In parallel, the method 200 comprises a step 230 of estimating the three-dimensional position of the center of the pupils by combining the images acquired simultaneously by at least two cameras 140. This stereovision makes it possible particularly to obtain the 3D position of the eyes without requiring an estimated of the vertex distance VD.

Indeed, using the calibration of the image acquisition system of the device 100 which comprises a plurality of cameras 140 and the 2D position of the centers of the pupils in each of the acquired images, the stereovision principle based particularly on a triangulation using epipolar geometry, makes it possible to obtain the 3D position of the centers of the pupils in the reference frame used for calibrating the cameras.

In alternative embodiments of this particular embodiment of the invention, the image acquisition system comprises a depth camera which makes it possible to obtain the 3D position of the eyes and hence of the center of the pupils, in the reference frame of the image acquisition system.

It should be noted that the 2D position of the center of the pupils was previously determined either manually by an optician, either automatically using a detector of characteristic points of the face. The automatic detection of the pupils is for example implemented using a method for searching the contour of the pupil, the center of a pupil being subsequently determined as being the center of an ellipse representing the pupil detected.

Thus, the automatic detection of the pupils in the image may for example be carried out by means of automatic iris detection which is easier to detect. Automatic iris detection may be initialized using a face detector which makes it possible to detect the corners of the eyes or an approximate center of each iris, but it may also be initialized using a spectacle detector which makes it possible to detect the eye area. The position of the center of a pupil being assumed to be equal to the center of the iris, then this involves locating the position, orientation and dimension of a circle in the three-dimensional space such as the projection of the circle in each of the images coincide with the iris which is comparable to an ellipse in the image. The pair of spectacles having been previously positioned, the search zone of the iris encircled by the frame of the pair of spectacles is relatively restricted which makes it possible to reduce the likelihood of a false positive. The parameters to be estimated are the radius of the circle, the position of the center of the circle and the orientation of the circle with respect to the center thereof. Given that the circle is planar and symmetrical in the plane with respect to the center thereof, two parameters suffice to characterize the orientation of the circle in the three-dimensional space. Six parameter values are thus to be estimated. The circle is initialized with a mean iris radius and such that the center thereof is projected at the level of the centers of the lenses in the image. Then, a technique based on a distance map or on a distance between the contour model and the image contour makes it possible to retrieve accurately the radius, position and orientation of the circle in the 3D space. 3D point sampling on this circle is projected in the acquired image. The circle being a planar object in the 3D space, the normals thereof at each sampled point are defined by lines passing through the points and the center of the circle. The normals are considered to be still visible as the circle object is planar and the user's irises are still visible. The cost function to be minimized is a sum of squares of distance between the projections of the points and the function bestCont( ).

In order to simplify the computations of the ocular measurements, the position of each pupil is expressed during the step 240 in the reference frame of the virtual frame from the 3D position of the frame and the 3D position of the center of the pupils.

The 3D position of the centers of the pupils in the reference frame of the frame is characterized by each eye by:

$$PG3D = R_M^{-1}(PG3D0 - T_M) \text{ and } PD3D = R_M^{-1}(PD3D0 - T_M)$$

where PG3D0 and PD3D0 are the 3D coordinates of the respective centers of the left and right pupil in the reference frame of the previously determined calibration.

The method 200 then comprises a step 250 during which the 3D position of the centers of the eyeballs is computed and expressed in the reference frame of the frame.

To this end, in the case where the image is acquired while the individual 110 is looking at the central camera 140$_1$ which is considered to be facing the individual 110, the position of the central camera 140$_1$ is then representative of the point of gaze of the eyes of the individual 110. Each center of rotation of an eye (PCOG3D and PCOD3D) is then situated on the line passing through each of the centers of the pupils and the point of gaze at a distance from the center of the pupil which is found to be the mean radius of an eyeball from which the size of a cornea is subtracted. It should be noted that the point of gaze may be slightly different for each eye of the individual 110.

The determination of the point of gaze may be defined according to a protocol during which the individual 110 looks at all or some of the following points:

the camera facing the individual;
a secondary camera;
a point displayed on the screen;
a point on the screen located at the top right;
a point on the screen located at the bottom left.

It should be noted that, in this protocol, the position of the screen is known with respect to the image acquisition system comprising the cameras.

In alternative embodiments of this step, the individual 110 looks at other points of gaze such as a camera which is not facing the individual or an image of his face reflected on a mirror situated in the vicinity of the screen 130, preferentially in the plane of the screen 130, and the position whereof with respect to the image acquisition means is known. The mirror may also advantageously correspond to the position of the main camera 140$_1$, by surrounding for example the main camera 140$_1$. It is then necessary to add an intermediate step consisting of involving the 3D position of the point viewed which is used to correct:

the position of the center of rotation of the eyeball (which is situated on the axis defined by the point of gaze and the pupil center). In other words, the position of the center of rotation of the eyeball is induced by the 3D position of the point of gaze and by the center of the pupil;

the gaze path by simulating same opposite for the computation of the optical center which is carried out subsequently during the step 260 of the method 200.

In the case where the image is acquired while the individual's point of gaze is unknown, it is possible to retrieve the position of the center of rotation of each eyeball from the circle computed for each iris during the step 230 of estimating the three-dimensional position of the center of the pupils. Taking into consideration a mean eyeball radius, it is then possible to determine a center of rotation of each eye by computing the position of the center of a sphere of equal radius to the mean eyeball radius and for which the iris represents a cutting plane. It should be noted that the center of rotation of the mean eyeball corresponds for each eye to the solution situated inside the skull. It is also possible to retrieve the position of the center of rotation of each eyeball by taking into consideration by way of simplified eye model a circle representing the iris situated at a given distance, such as for example the mean value of a radius of a standard eyeball or adapted to the deformation relative to the correction, less the thickness of a cornea (i.e. the distance between the apex of the cornea and the iris). The position of the center of rotation is then determined by resolving the position of this simplified model on the acquired images by a method described for example in the international application published under the number WO 2013/045531.

During the step 260, the optical centers of the lenses (PCOVG3D and PCOVD3D, expressed in the reference frame of the frame) are given by the intersection between each of the lenses and the line passing through the center of rotation of the corresponding eye and the point of gaze thereof.

The effective diameter (ED) may then be obtained by multiplying by two the distance between the optical center of a lens (PCOVG3D and PCOVD3D) and the furthest 3D point belonging to the same lens group.

In parallel, the method 200 comprises a step 270 during which the 3D position of the bottom points of the pupils and of each circle surrounding the lenses of the frame is computed in the reference frame of the frame according to the 3D position of the frame and the center of the pupils.

Figure 3:
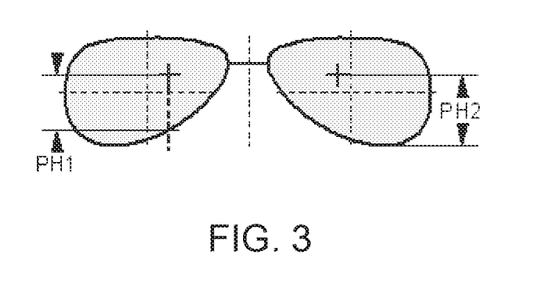
FIG. 3 illustrates the definition of the heights in the DATUM and BOXING systems.

The computation of the positions performed during the step 270 is based on a similar method to that of the computation of the 3D position of the centers of the pupils performed during the step 230. It is thus possible to estimate:

the 3D position of the bottommost points on each pupil (if the pupil is covered by the bottom eyelid, this will consist of the bottommost visible point, on the pupil/eyelid boundary). The detection of these points in the acquired images may be automated by actuating a detector on the pupils or based on the image of the contours at the level of the pupil to form a circle.

the 3D position of the "frame base" points at the level of each lens of the frame. To determine these "frame base" points, it is the bottommost point of the group forming each of the lenses in 3D for the BOXING fitting system and the bottommost point of the group forming each of the lenses in 3D which is situated perpendicularly to each optical center for the DATUM system. These points will be useful for computing the heights PH1 in the case of the DATUM system or PH2 in the case of the BOXING system, as illustrated in FIG. 3.

It should be noted that the detection of these points in the BOXING system is not necessarily to be carried out in the acquired images as these points may be previously located on the 3D modelling of the frame.

The method 200 finally comprises a step 280 of computing ocular measurements. The vertex distances (left and right) are found to be the Euclidean distances between the centers of the irises and the projection thereof on each of the lenses:

$$DVOG=|PG3D-PCOVG3D|_2 \text{ and } DVOD=|PG3D-PCOVG3D|_2$$

The pupillary distance (PD) is given by:

$$PD=|PCOG3D-PCOD3D|_2$$

Based on the coordinates of the center of the pupils of the individual 110 determined during the step 230, let (xPG, yPG,zPG) be the 3D coordinates of the center of the left pupil in the reference frame of the frame and (xPD,yPD, zPD) be the 3D coordinates of the center of the right pupil.

Figure 4:
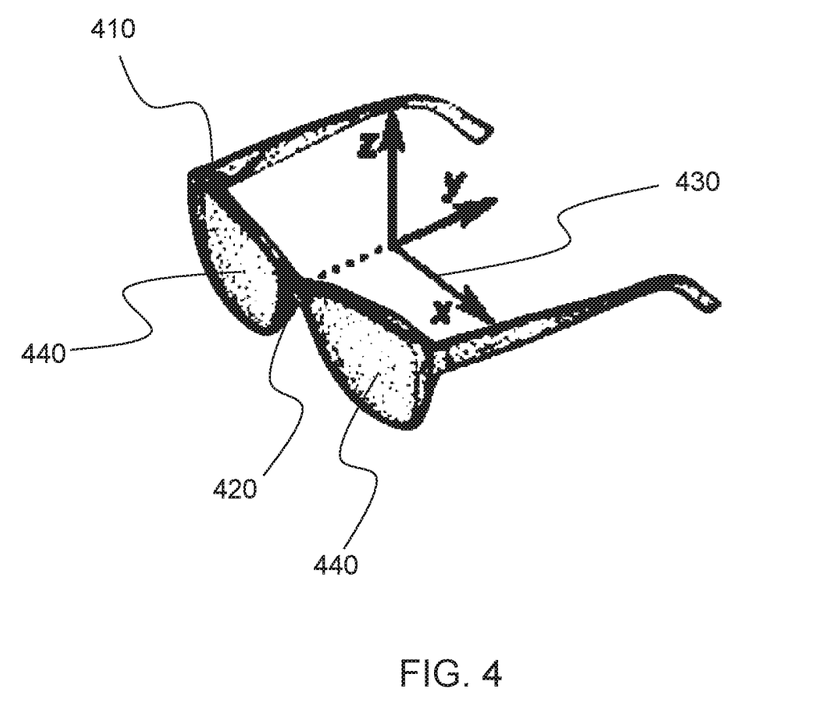
FIG. 4 is a three-dimensional representation of a frame and the associated reference frame.

It should be noted, as illustrated in FIG. 4, that the center of the reference frame of the frame 410 is situated at the center of the bridge 420 of the frame 410 and corresponds to the origin of the x-axis 430 defined as the axis passing through the two lenses 440.

The monocular pupillary distances (monoPD) are given by:

$$monoPDG=-xPG$$

$$monoPDD=xPD$$

Based on the 3D coordinates of the bottom of the pupils and the bottom of the frames determined in the reference frame of the frame during the step 270, let (xPdownG, yPdownG, zPdownG) be the 3D coordinates of the bottom of the left pupil, (xPdownD, yPdownD, zPdownD) the 3D coordinates of the bottom of the right pupil, (xMG, yMG, zMG) the 3D coordinates of the bottom of the frame at the level of the left lens and (xMD, yMD, zMD) the 3D coordinates of the bottom of the frame at the level of the right lens.

The heights (FH) are given by:

$$FHG=xMG-zPG+\text{GrooveOffset}$$

$$FHD=xMD-zPD+\text{GrooveOffset}$$

The segments heights (SH) are given by:

$$SHG = zMG - zPdownG + \text{GrooveOffset}$$

$$SHD = zMD - zPdownD + \text{GrooveOffset}$$

where GrooveOffset represents the groove depth of the frame chosen by the patient. This value is entered according to the type of material of the frame or retrieved directly from the 3D modelling of the frame.

Finally, the pantoscopic tilt is given directly by the angle formed by the plane of the lenses of the frame and the vertical plane in the acquired image of the individual 110, if the individual 110 adopts a natural posture for distance vision, i.e. a horizontal gaze direction, or oriented towards the horizon.

In the case where the acquisition is carried out without the individual being able to adopt a natural posture for distance vision as is for example the case when the individual 110 looks at an excessively high point which requires the individual to lift his head, the estimation of the pantoscopic tilt may be performed in two ways:

1. Detecting the corners of the mouth on the images of the individual and thus estimating the 3D position of the center of these two corners of the mouth; considering the plane passing through this estimated 3D point and the centers of the pupils; estimating the pantoscopic tilt by measuring the angle formed by this plane and the plane of the lenses of the selected frame.

2. Using the pantoscopic tilt measurable during the digitization of the selected frame by placing same on a dummy or by positioning the three-dimensional representation of the selected frame on an average virtual avatar representing an average human's head.

It should be noted that the dummy may be selected between a plurality of dummies according to the individual's morphology, particularly that having the closest morphology to that of the individual.

In an alternative embodiment of this particular embodiment of the invention, the pair of spectacles selected by the individual is not physically accessible when using the device for measuring optical parameters. In this case, given that a three-dimensional representation of the frame of the pair of spectacles selected by the individual is stored in the database, the individual uses measurement device while wearing a second pair of spectacles which is available to the individual and serves as a reference for determining the parameter(s). It should be noted that a faithful three-dimensional representation of the frame of the second pair of spectacles is also stored in the database accessible to the measurement device.

In this alternative embodiment, the method for automatically determining at least one parameters, implemented by the measurement device, makes it possible to obtain the 3D position of the pair of spectacles worn and the centers of rotation of the eyes (PCOG3D and PCOD3D) in the acquired image as well as the values of PD and monoPD which are not dependent on the pair of spectacles worn.

So that the other parameters, particularly FH, SH, PA, VD and ED, are linked with the selected pair of spectacles and not with the worn pair of spectacles, the determination method also comprises a step of determining a positioning offset between the worn spectacle frame with respect to the selected spectacle frame. The determination of the offset is carried out by superimposing the three-dimensional representations of the two frames on a three-dimensional model of a face. It should be noted that the three-dimensional model of a face may be representative of the individual's face. This three-dimensional face model may be prepared from images of the individual's face or selected from a virtual avatar according to the individual's typical morphology. This selection is carried out for example by means of the value of PD alone, or a configuration value dependent on PD and the minimum distance between the temple spacing parameters obtained on the user and the values obtained on the reference dummies. This configuration value may be for example obtained on actual dummies by measuring the 3D image alignment, or by physical simulation of the 3D pair on virtual dummies (see for example the international patent application published under the number WO 2016/135078).

Once the positioning offset is determined along the three axes, the three-dimensional representation of the selected frame is positioned in the reference frame of the image acquisition system with respect to the three-dimensional representation of the frame worn by the individual by means of the positioning offset between the two frames. Thus, the expression of the position of each pupil in the reference frame of the three-dimensional representation of the selected frame may be performed and makes it possible to determine the values of the parameters FH, SH, PA, VD and ED from the relative position of the eyes with respect to the three-dimensional representation of the selected frame.

Figure 7:
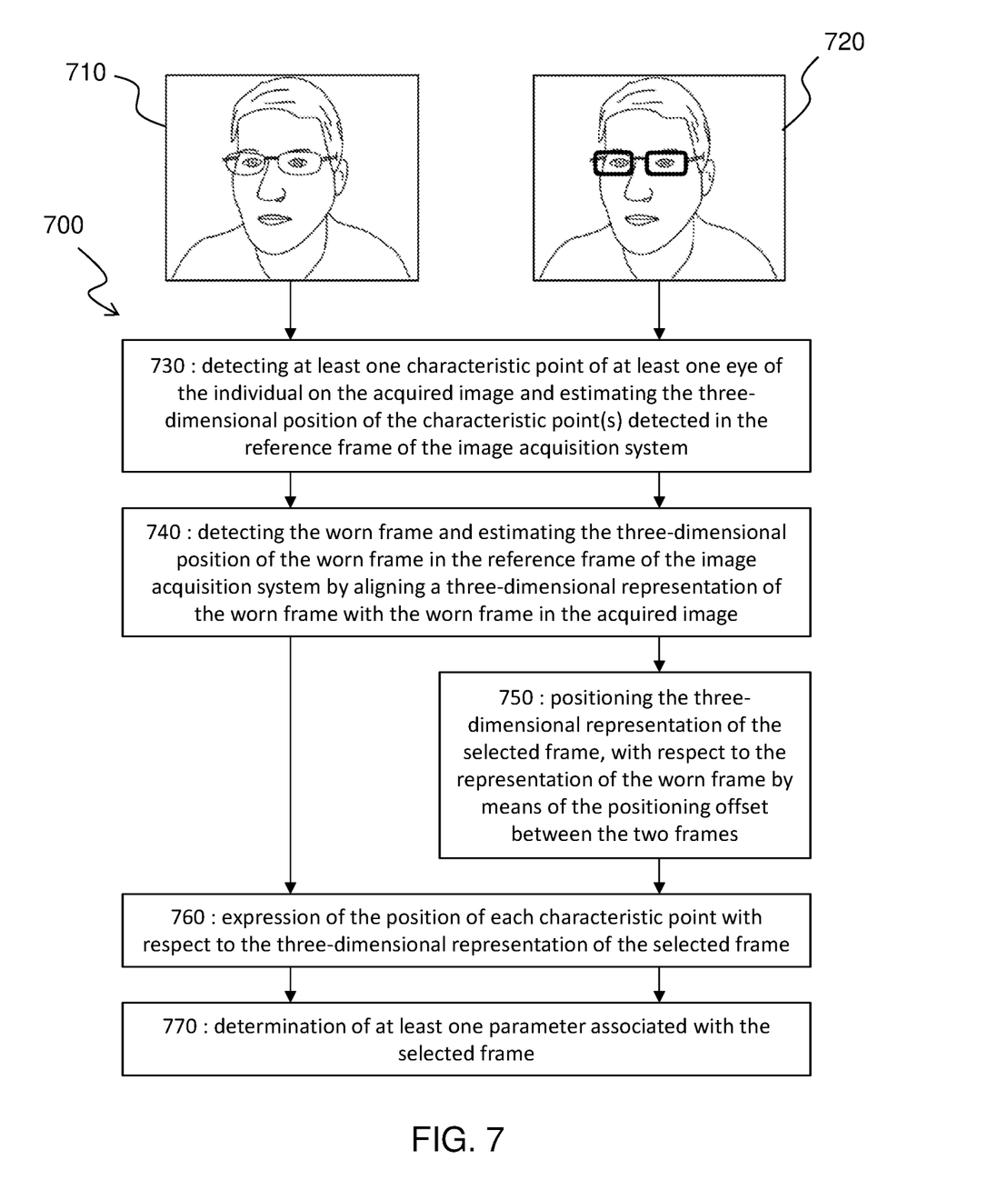
FIG. 7 illustrates in synoptic form the main steps of the method according to two embodiments of the invention.

In sum, FIG. 7 illustrates in the form of a synoptic diagram the main steps of the automatic determination method 700 implemented either using an image 710 of the individual wearing the selected frame on their face, or using an image 720 of the individual wearing the second frame of their face.

In both cases, the method 700 comprises the steps of:
- 730, detecting at least one characteristic point of at least one eye of the individual on the acquired image and estimating in the reference frame of the image acquisition system, the three-dimensional position of the characteristic point(s) detected;
- 740, detecting the worn frame and estimating the three-dimensional position of the worn frame in the reference frame of the image acquisition system by aligning a three-dimensional representation of the worn frame with the worn frame in the acquired image.

In the case where the worn frame is the frame of the second pair of spectacles, the method 700 comprises an additional step 750 of positioning the three-dimensional representation of the selected frame, the representation of the selected frame being positioned with respect to the representation of the worn frame by means of the positioning offset between the two frames.

Finally in both cases, the position of each characteristic point is expressed with respect to the three-dimensional representation of the selected frame, during the step 760, preferentially in the reference frame of the three-dimensional representation of the selected frame.

At least one parameter associated with the selected frame is then determined from the relative position of the eyes with respect to the three-dimensional representation of the selected frame during the step 770.

In optional alternative embodiments of the invention, at least one image of the individual not wearing spectacles on their face is acquired by the cameras 140 of the image acquisition system in order to facilitate the computations made during the method 700.

From this or these image(s) of the individual's head without spectacles, a better three-dimensional model of the face may be prepared, suitable for estimating more accurately the position of the characteristic points of the face with respect of the representation of the pair of spectacles worn in the reference frame of the image acquisition system.

To this end, the model of the face without spectacles is positioned in the space of the image acquisition system by aligning the model of the face without spectacles, which makes it possible to obtain a more realistic positioning of the individual's face and correct the estimated position of the eyes and particularly that of the center of rotation of each eye in the reference frame of the three-dimensional representation of the selected frame.

In other words, the alignment of the model of the face corresponds to a positioning and orientation of said model in the reference frame of the image acquisition system thanks to actual positioning and orientation parameters of the individual's face predetermined with respect to the image acquisition system.

Thus, the determination of at least one parameter is performed more rapidly and accurately.

Furthermore, knowledge of the face without spectacles makes it possible to do away with the interference induced by the lenses of the pair of spectacles actually worn, particularly if the lenses has a wavelength cutoff or if the lenses comprise optical correction providing non-negligible refraction.

Advantages of the Invention

A first advantage of the method for automatically determining an optical parameter is the measurement accuracy. Indeed, no manual intervention is required to compute the ocular measurements on a large number of images. It is thus possible to have a high confidence in respect of the measurements made by the automatic determination method.

Unlike existing systems, wherein the measurement accuracy is dependent on the positioning and orientation of the patient's head, the method according to the present invention makes it possible to reconstruct the "eyes+spectacles" system in 3D. This has the advantage of retrieving the ocular measurements in the acquisition position of the patient's head, which may be the natural position thereof and otherwise, a correction of the measurements may be made by simulating the user's "eyes+spectacles" 3D system with a different gaze and different head orientation.

Thanks to the 3D reconstruction of the patient's "eyes+ spectacles" system, it is possible to:
- compute the ocular distance vision measurements then estimate these ocular near vision measurements by carrying out a simulation of the system with a closer point of gaze;
- compute the ocular near vision measurements then estimate these ocular distance vision measurements by carrying out a simulation of the system with a closer point of gaze;
- compute the gaze path on each lens by carrying out a simulation of the system with a set of near and distance points of gaze;
- measure the strabismus of an eye from a plurality of images of the individual looking at a point at reading distance (about 20 cm), a point at infinity and a point at an intermediate distance.

Further Optional Features of the Invention

In alternative embodiments of the invention, the measurement of the pupillary distance (PD) may be made by means of at least two images of the individual not wearing a pair of spectacles on their face, the images being acquired simultaneously or quasi-simultaneously by two separate cameras of the device. It should be noted that the images acquired by the cameras are calibrated.

The invention claimed is:

1. A method for automatically determining at least one parameter associated with an ophthalmic device selected by an individual, said ophthalmic device comprising a frame referred to as a selected frame, the determination of at least one parameter being carried out from an image of the face of the individual wearing a spectacle frame, referred to as a worn frame, said worn frame being the selected frame, said image being acquired by an image acquisition system, the method comprising:
   - detecting at least one characteristic point of at least one eye of the individual on the acquired image and estimating, in the reference frame of the image acquisition system, the three-dimensional position of the characteristic point(s) detected;
   - detecting the worn frame in the acquired image and estimating the three-dimensional position of the worn frame in the system coordinate of the image acquisition system by aligning a three-dimensional representation of the worn frame with the worn frame in the acquired image;
   - expressing the position of each characteristic point with respect to the three-dimensional representation of the selected frame;
   - determining the parameter(s) from the relative position of the eyes with respect to the three-dimensional representation of the selected frame;
   - wherein the characteristic point of one eye is the center of its pupil which is computed as the center of a circle representing the iris, said circle being positioned and oriented in three dimensions by computing the minimum of a distance function between the projection of the circle on the image and the contour of the pupil on the image;
   - wherein the position of the center of the eyeball of an eye is computed:
   - in the case where the point of gaze of said eye is known, as equal to the point situated on the line defined by the center of the pupil of said eye and said point of gaze, at a distance equal to the mean radius of an eyeball;
   - in the case where the point of gaze of said eye is unknown, as equal to the center of a sphere of radius equal to the mean radius of the eyeball and for which the iris represents a cutting plane.

2. The method according to claim 1, wherein the estimation of the three-dimensional position of the worn frame is performed by computing the minimum of a distance function between the contour of the projection of the three-dimensional representation of the worn frame and the contour of the worn frame in the acquired image, the three-dimensional representation of the worn frame suitable for being articulated and/or deformed.

3. The method according to claim 1, further comprising:
   - determining the 3D position of the point of gaze of each eye; and
   - correcting the position of the center of rotation of the eyeball based on the 3D position of the predetermined point of gaze.

4. The method according claim 3, wherein the 3D position of the point of gaze of each eye corresponds to an element wherein the position is known with respect to the image acquisition system.

5. The method according to claim 1, further comprising a step of preparing a three-dimensional model of the face, the three-dimensional model comprising the characteristic point(s) detected, and a step of superimposing the virtual frame on the three-dimensional model of the face.

6. The method according to claim 5, further comprising a step of prior acquisition of at least one image of the individual's face without spectacles, the preparation of the three-dimensional model of the face comprising a substep of aligning the model of the face prepared without spectacles with the individual's face.

7. The method according claim 1, wherein the image acquisition system is stereoscopic.

8. The method according to claim 7, wherein all or some of the cameras of the image acquisition system are calibrated metrically.

9. The method according to claim 1, wherein the image acquisition system comprises at least one infrared camera.

10. The method according to claim 1, wherein the parameter determined comprises at least one of:
pupillary distance;
monocular pupillary distance;
pantoscopic tilt;
vertex distance;
height between the frame base and the center of a pupil;
height between the frame base and the bottom eyelid;
effective lens diameter; and
gaze path.

11. The method according to claim 10, wherein the determination of the pantoscopic tilt is performed by:
detecting the two corners of the individual's mouth;
estimating the 3D position of the midpoint between the two corners of the mouth;
determining the value of the pantoscopic tilt by computing the angle between the plane formed by the midpoint and the characteristic point of each pupil, and the plane of the lenses fitted in the selected frame.

12. The method according to claim 1, wherein at least one parameter is determined also according to a bottom point of the frame, the bottom point being included on a line tangent simultaneously to the two lenses.

13. The method according to claim 1, further comprising, beforehand, a step of calibrating the acquisition system.

14. The method according to claim 1, further comprising a step of sending a lens command accounting for the predetermined parameter(s).

15. The method according to claim 1, further comprising a step of adapting a lens of a pair of spectacles based on the predetermined parameter(s).

16. A computer program product comprising a series of instructions for implementing the steps of the automatic determination method according to claim 1, where said program is executed on a computer.

17. A device comprising a screen, a plurality of cameras, a computer processor and a computer memory storing the computer program product according to claim 16.

18. A method for automatically determining at least one parameter associated with an ophthalmic device selected by an individual, said ophthalmic device comprising a frame referred to as a selected frame, the determination of at least one parameter being carried out from an image of the face of the individual wearing a spectacle frame, referred to as a worn frame, said worn frame being a frame of a second ophthalmic device, said image being acquired by an image acquisition system, the method comprising:
detecting at least one characteristic point of at least one eye of the individual on the acquired image and estimating, in the reference frame of the image acquisition system, the three-dimensional position of the characteristic point(s) detected;
detecting the worn frame in the acquired image and estimating the three-dimensional position of the worn frame in the system coordinate of the image acquisition system by aligning a three-dimensional representation of the worn frame with the worn frame in the acquired image;
positioning, in the reference frame of the image acquisition system, a three-dimensional representation of the selected frame, the representation of the selected frame being positioned with respect to the representation of the worn frame by means of a positioning offset between the two frames, said positioning offset being predefined;
expressing the position of each characteristic point with respect to the three-dimensional representation of the selected frame;
determining the parameter(s) from the relative position of the eyes with respect to the three-dimensional representation of the selected frame.

19. The method according to claim 18, wherein the estimation of the three-dimensional position of the worn frame is performed by computing the minimum of a distance function between the contour of the projection of the three-dimensional representation of the worn frame and the contour of the worn frame in the acquired image, the three-dimensional representation of the worn frame suitable for being articulated and/or deformed.

20. The method according to claim 18, wherein the characteristic point of each pupil is the center of the pupil which is computed as the center of a circle representing the iris, said circle being positioned and oriented in three dimensions by computing the minimum of a distance function between the projection of the circle on the image and the contour of the pupil on the image.

21. The method according to claim 20, wherein the position of the center of the eyeball of an eye is computed:
in the case where the point of gaze of said eye is known, as equal to the point situated on the line defined by the center of the pupil of said eye and said point of gaze, at a distance equal to the mean radius of an eyeball;
in the case where the point of gaze of said eye is unknown, as equal to the center of a sphere of radius equal to the mean radius of the eyeball and for which the iris represents a cutting plane.

22. The method according to claim 21, further comprising:
determining the 3D position of the point of gaze of each eye; and
correcting the position of the center of rotation of the eyeball based on the 3D position of the predetermined point of gaze.

23. The method according claim 22, wherein the 3D position of the point of gaze of each eye corresponds to an element wherein the position is known with respect to the image acquisition system.

24. The method according to claim 18, further comprising a step of determining the positioning offset between the three-dimensional representation of the selected frame, and the three-dimensional representation of the second frame worn by the individual, by positioning the two three-dimensional representations on a three-dimensional model representing a face.

25. The method according to claim 18, further comprising a step of preparing a three-dimensional model of the face, the three-dimensional model comprising the characteristic point(s) detected, and a step of superimposing the virtual frame on the three-dimensional model of the face.

26. The method according to claim 25, further comprising a step of prior acquisition of at least one image of the individual's face without spectacles, the preparation of the three-dimensional model of the face comprising a substep of aligning the model of the face prepared without spectacles with the individual's face.

27. The method according claim 18, wherein the image acquisition system is stereoscopic.

28. The method according to claim 18, wherein the image acquisition system comprises at least one infrared camera.

29. The method according to claim 27, wherein all or some of the cameras of the image acquisition system are calibrated metrically.

30. The method according to claim 18, wherein the parameter determined comprises at least one of:
   pupillary distance;
   onocular pupillary distance;
   pantoscopic tilt;
   vertex distance;
   height between the frame base and the center of a pupil;
   height between the frame base and the bottom eyelid;
   effective lens diameter; and
   gaze path.

31. The method according to claim 30, wherein the determination of the pantoscopic tilt is performed by:
   detecting the two corners of the individual's mouth;
   estimating the 3D position of the midpoint between the two corners of the mouth;
   determining the value of the pantoscopic tilt by computing the angle between the plane formed by the midpoint and the characteristic point of each pupil, and the plane of the lenses fitted in the selected frame.

32. The method according to claim 18, wherein at least one parameter is determined also according to a bottom point of the frame, the bottom point being included on a line tangent simultaneously to the two lenses.

33. The method according to claim 18, further comprising, beforehand, a step of calibrating the acquisition system.

34. The method according to claim 18, further comprising a step of sending a lens command accounting for the predetermined parameter(s).

35. The method according to claim 18, further comprising a step of adapting a lens of a pair of spectacles based on the predetermined parameter(s).

36. A computer program product comprising a series of instructions for implementing the steps of the automatic determination method according to claim 18, where said program is executed on a computer.

37. A device comprising a screen, a plurality of cameras, a computer processor and a computer memory storing the computer program product according to claim 36.

* * * * *